UNITED STATES PATENT OFFICE.

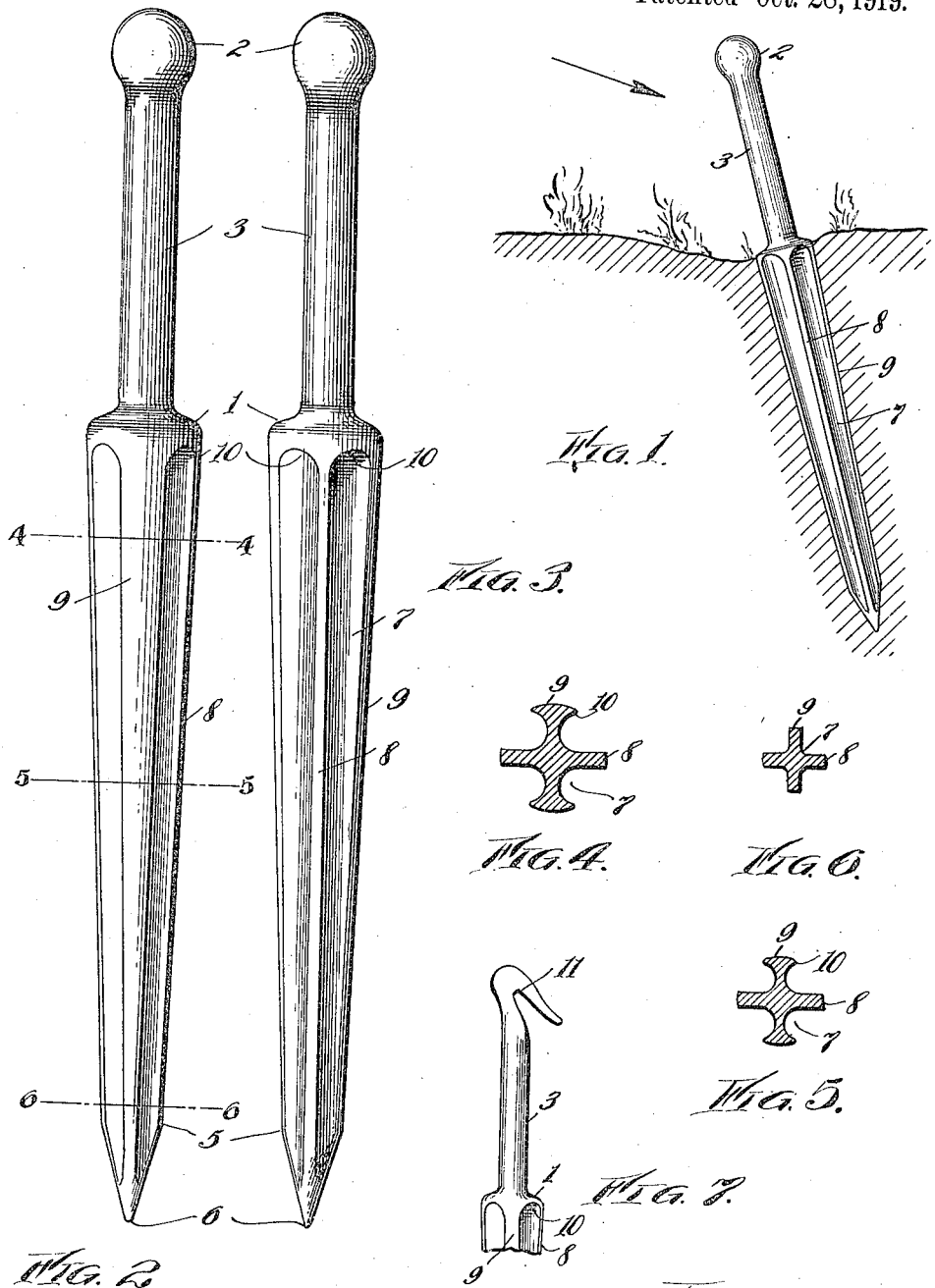

WILLIAM J. MARTIN, OF CLEVELAND, OHIO.

STAKE.

1,320,081.    Specification of Letters Patent.    Patented Oct. 28, 1919.

Application filed August 1, 1919. Serial No. 314,637.

*To all whom it may concern:*

Be it known that I, WILLIAM J. MARTIN, citizen of the United States, residing at Cleveland, in the county of Cuyahoga and State of Ohio, have invented certain new and useful Improvements in Stakes, of which the following is a specification.

This invention relates to a device which consists of the novel features hereinafter described and pointed out in the following claims.

The improved stake was designed primarily for use in connection with a game of quoits and owing to its particular construction is particularly adapted for use in this connection, in that the continual pounding of the quoits upon the head thereof will not drive the stake into the ground.

The device may be so designed as to permit of use in connection with a tent for the purpose of retaining the stay ropes in place. The only modification required being in the shape of the head of the stake.

The stake is so designed that it will permit of driving into the ground with comparative ease and will also permit of being withdrawn from the ground likewise, the particular design of the stake being such as to prevent any lateral movement in the ground.

The foregoing objects may be obtained by the particular embodiment of the invention shown in the accompanying drawings wherein like reference numerals designate similar parts of reference throughout the various views and wherein Figure 1 is a side elevation of the stake showing the position in which it is driven into the ground for use in playing quoits; Fig. 2 is a side elevation of the stake; Fig. 3 is a view of the side taken at right angles to Fig. 2; Figs. 4, 5 and 6 are sectional details corresponding to the lines 4, 5 and 6 of Fig. 2 and Fig. 7 is a detail of a modified form of head which may be used as a tent stake.

The improved stake comprises a body portion indicated generally at 1 which is substantially circular in cross section and is made preferably of malleable iron and later annealed to the proper degree of hardness which will prevent the stake from being mutilated by contact of the quoits which are thrown upon it. The upper end of the stake is upset to form a spherical head 2 upon a reduced cylindrical portion 3 projecting above the ground providing thereby an appropriate mark for the quoits to be thrown at. The head 2 is so designed as to facilitate the making of "ringers" when used in a game of quoits due to the fact that quoits striking the top of the head at any point in front of the center line thereof will be deflected downwardly upon the neck portion 3 of the stake. This has a decided advantage over the ordinary type of stake, furthermore the fact that the head is spherical prevents the stake from mutilating the quoits.

At the point indicated at 4 the stake is enlarged to provide a shoulder and from this point downward it tapers until it reaches the point 5 which is very near to the bottom, the bottom proper of the stake being pointed as shown at 6 which permits of ease for driving into the ground. Between the points 4 and 5 are provided flutes 7 the provision of which forms ribs 8 and 9 upon the stake. The ribs 9 are formed with lateral extensions 10 which are tapered from the top downwardly to the bottom for a purpose to be hereinafter described. The ribs 8 are formed with their sides parallel and extending thus from the top to the bottom. This design is considered quite important in that when driven into the ground the ribs 9 are so positioned that they will present themselves at right angles to the line of thrust of the quoits as indicated by the arrow in Fig. 1 when the same are thrown against them, this it will be noted produces a greater area of resistance against the earth and prevents any lateral movement of the stake at such times.

It is obvious that the ribs 8 may be of a like formation as the ribs 9 but it is my desire to decrease the weight of the stake to a minimum, also to design one which will permit of easy casting and when the ribs 8 are so constructed the casting would be more difficult. By the construction of the stake shown in the figures it may be gated during the casting thus reducing the labor and cost thereof.

By terminating the flutes just beyond that portion of the stake which extends above the ground it is prevented from being driven farther into the ground by the continual pounding of the quoits when they are thrown upon it. This is effected by the earth packing tightly within the upper portion 10 of the flutes.

This stake is preferably used in conjunction with a game of quoits, but it will be apparent that by modifying the upper end of the stake in such a manner as to provide a hook 11 as shown in Fig. 7 the stake may be used in connection with tents whereby to retain the guy ropes of the tent in position.

While I have shown this preferred type of design in the drawings herein attached it is obvious that various modifications of the same may be made and I do not wish to limit myself further than is required by the state of the art or that which is within the scope of the appended claims.

I claim:

1. A stake the lower portion of which is ribbed lengthwise, some of the ribs being enlarged in cross section at their outer edges.

2. A stake the lower portion of which is provided with ribs tapered lengthwise, forming flutes therebetween, some of the ribs being recessed or undercut on their sides adjacent the flutes.

3. A stake having plain ribs and alternating undercut ribs, extending lengthwise, substantially as described.

In testimony whereof, I do affix my signature in presence of two witnesses.

WILLIAM J. MARTIN.

Witnesses:
GEORGE W. ROWLAND,
JENNIE B. WOOD.

Copies of this patent may be obtained for five cents each, by addressing the "Commissioner of Patents, Washington, D. C."